US006647548B1

(12) United States Patent
Lu et al.

(10) Patent No.: US 6,647,548 B1
(45) Date of Patent: Nov. 11, 2003

(54) CODED/NON-CODED PROGRAM AUDIENCE MEASUREMENT SYSTEM

(75) Inventors: Daozheng Lu, Dunedin, FL (US); David H. Harkness, Wilton, CT (US)

(73) Assignee: Nielsen Media Research, Inc., New York, NY (US)

( * ) Notice: Subject to any disclaimer, the term of this patent is extended or adjusted under 35 U.S.C. 154(b) by 0 days.

(21) Appl. No.: 08/709,180

(22) Filed: Sep. 6, 1996

(51) Int. Cl.[7] .......................... H04N 9/00; H04N 7/16

(52) U.S. Cl. .......................... 725/20; 725/13

(58) Field of Search .......................... 725/20, 19, 17, 725/14, 13, 12, 9, 10, 44, 45, 46, 1, 2, 4; H04N 9/00, 7/16, 7/10

(56) References Cited

U.S. PATENT DOCUMENTS

| | | | | | |
|---|---|---|---|---|---|
| 4,025,851 | A | | 5/1977 | Haselwood et al. | 325/31 |
| 4,658,290 | A | * | 4/1987 | McKenna et al. | 725/11 |
| 4,677,466 | A | | 6/1987 | Lert, Jr. et al. | 358/84 |
| 4,697,209 | A | | 9/1987 | Kiewit et al. | 358/84 |
| 4,718,106 | A | | 1/1988 | Weinblatt | 455/2 |
| 4,807,031 | A | | 2/1989 | Broughton et al. | 358/142 |
| 4,858,000 | A | | 8/1989 | Lu | 358/84 |
| 4,876,736 | A | | 10/1989 | Kiewit | 455/2 |
| 4,905,080 | A | * | 2/1990 | Watanabe et al. | 725/14 |
| 4,907,079 | A | | 3/1990 | Turner et al. | 358/84 |
| 4,945,412 | A | | 7/1990 | Kramer | 358/142 |
| 4,972,503 | A | | 11/1990 | Zurlinden | 455/2 |
| 5,031,228 | A | | 7/1991 | Lu | 382/38 |
| 5,374,951 | A | * | 12/1994 | Welsh | 725/20 |
| 5,425,100 | A | | 6/1995 | Thomas et al. | 380/20 |
| 5,483,276 | A | * | 1/1996 | Brooks et al. | 725/10 |
| 5,526,427 | A | | 6/1996 | Thomas et al. | 380/20 |
| 5,532,732 | A | * | 7/1996 | Yuen et al. | 725/20 |
| 5,550,928 | A | | 8/1996 | Lu et al. | 382/116 |
| 5,585,865 | A | * | 12/1996 | Amano et al. | 725/14 |
| 5,752,159 | A | * | 5/1998 | Faust et al. | 327/276 |
| 5,798,785 | A | * | 8/1998 | Hendricks et al. | 725/46 |

FOREIGN PATENT DOCUMENTS

| | | |
|---|---|---|
| WO | WO 94/17609 | 8/1994 |
| WO | WO 95/12278 | 5/1995 |

OTHER PUBLICATIONS

European Search Report, dated Apr. 14, 1998, Application No. EP 97/14422.

* cited by examiner

*Primary Examiner*—Vivek Srivastava
(74) *Attorney, Agent, or Firm*—Grossman & Flight, LLC

(57) ABSTRACT

An audience measurement system identifies a program which is broadcast from a signal source and to which a receiver is tuned. The audience measurement system includes a code reader for reading an ancillary code of the program to which the receiver is tuned, a channel status detector for determining channel status relating to channels to which the receiver is tuned, a memory for storing ancillary codes read by the code reading means and for storing channel status determined by the channel status determining means if ancillary codes are not readable by the code reading means, and a communicator for communicating the ancillary code and/or the channel status to a central office computer.

37 Claims, 5 Drawing Sheets

90

| TIME | FLAG | TYPE | CODE | CHANNEL STATUS |
|---|---|---|---|---|
| H:M:0 | T.V. ON | 01 | | 5 |
| H:M:01 | | 05 | 1FA377 | 5 |
| H:M+3:03 | | 05 | 4FA5BB | 5 |
| H:M+3:05 | CHANNEL CHANGE | 02 | | |
| H:M+3:08 | | 06 | | |
| H:M+3:24 | | 06 | | |
| 100 | 92 | 94 | 96 | 98 |

FIGURE 4

CODED/NON-CODED PROGRAM AUDIENCE MEASUREMENT SYSTEM

TECHNICAL FIELD OF THE INVENTION

The present invention relates to an audience measurement system and, more particularly, to a coded/non-coded program audience measurement system which identifies the programs or stations of televisions or radios which are watched, or listened to, by an audience.

BACKGROUND OF THE INVENTION

Although the present invention is described herein with particular reference to television audience monitoring, it should be realized that the present invention applies also to the monitoring of other forms of audience entertainment, such as to the monitoring of radio audiences. Moreover, as used herein, the term "programs" means segments of various lengths such as all or parts of programs, commercials, promos, public service announcements, and so on.

Broadcast audience measurements have conventionally been made with equipment placed in statistically selected households to monitor the channels to which each receiver in the statistically selected households is tuned. Currently, data from such statistically selected households are collected at a central office and compared with separately collected reference data. This reference data includes a compiled list of those programs which are available on each receivable channel during each time period of interest, and are commonly referred to as program records. (Reference data may alternatively be referred to as station records, cable records, or the like.) By comparing the tuned channels, i.e. the channels to which the receivers in the statistically selected household were tuned, to the programs available on those channels at the time, an inference can be made as to the identities of the programs selected by the members of the household.

Conventional audience measurement equipment is expensive to install in a statistically selected household. A significant part of this expense is associated with the need to calibrate the tuned channels to the corresponding program sources (especially when the signals that come into the household are routed through a multitude of tuners, such as television tuners, cable converters, VCR tuners, and the like). Another significant part of this expense arises from the common need to open up (i.e., intrude into) monitored receivers and/or associated equipment so that the installer of the audience measurement equipment can secure access to the tuners of these receivers and/or associated equipment. Also, members of the statistically selected households may be reluctant to permit such intrusions for fear that the intrusions will cause damage or be unsightly.

Moreover, there is always at least some inherent confusion in the viewing records produced by an audience measurement system because, although the system accurately reports both the channels to which the receivers in a statistically selected household are tuned and the times during which those receivers are tuned to those channels, the programs currently being broadcast on those channels and at those times are not always accurately known. One suggested approach to avoiding this confusion is to label each broadcast program with an ancillary code (e.g., a digital code written on a selected video line in the vertical blanking interval of each video program to be broadcasted and/or monitored). This ancillary code can then be read by the metering equipment in the sampled households and can be compared (e.g., in a central office computer) to the ancillary codes stored in a code-program name library. The code-program name library contains a manually entered list of program names and the ancillary codes associated therewith. Thus, given an ancillary code of a program selected for viewing and/or listening in the sampled households, the program name of this program can be easily determined from the library. Such a system, however, has not been successfully employed in statistically selected households for audience measurement because it requires all possible programs to be encoded before a complete measurement can be made, and because it requires an ancillary code that can pass through a variety of distribution and broadcasting processes without being stripped or corrupted and thereby rendered illegible.

Therefore, instead of reading ancillary codes in statistically selected households in order to identify the programs to which receivers are tuned, ancillary codes are read in each market area in order to instead verify the program records. That is, the typical audience measurement system determines both the channels to which the receivers in the statistically selected households are tuned and the times that the receivers are tuned to those channels. The tuned channels, and the times during which those channels are tuned, are periodically transmitted to a central facility where the tuned channels, and the times during which those channels are tuned, are compared to the aforementioned program record. This program record is compiled from information supplied by the sources of these programs, and is intended to reflect the identity of the programs which are supposed to be aired at the times indicated in the program records. Current systems which read the ancillary codes of these programs are used simply to verify the accuracy of the program records, i.e. to verify that the programs were actually aired at the intended times and on the intended channels as indicated in the program records. Accordingly, even though not all programs are labelled with ancillary codes, some are. These ancillary codes are read in order to verify that at least those programs, which contain ancillary codes, were aired at the intended times and on the intended channels.

An example of such a system is disclosed by Haselwood, et al. in U.S. Pat. No. 4,025,851, which is assigned to the same assignee as the current application. The system disclosed therein monitors those programs which have an ancillary code written on a video line of one or more of a video program's vertical blanking intervals. The system described in this patent, which is generally referred to as the Automated Monitoring of Line-up (AMOL) system, has been in general use in the United States for over a decade, and is used to determine (i) the identity of aired programs, (ii) the local stations which air these programs, and (iii) the times during which these programs are aired. A system of this type significantly reduces the complexity, and improves the accuracy, of the resulting program records that are an essential element of current national television audience measurements. The AMOL system has not been used heretofore within statistically sampled households due to intrusive installations of metering equipment, code loss error problems, and lack of codes in some programs all of which can be more successfully remedied at a central monitoring site, but that are intractable in sampled households.

Other code monitoring systems include the radio audience monitoring system disclosed by Weinblatt in U.S. Pat. No. 4,718,106. Weinblatt teaches an audience measurement system in which each participant wears a metering device that includes a microphone and a detection circuit which responds to in-band codes in the programming. Weinblatt discusses background noise as a problem in this method, and teaches that such noise is avoidable by using a microphone having a low sensitivity. The system disclosed in U.S. Pat. No. 4,807,031 utilizes a robust video luminance coding method with a low data rate. The system disclosed in U.S. Pat. No. 4,945,412 utilizes a sub-audible 40 Hz tone to encode the audio portion of a broadcast.

In U.S. patent application Ser. No. 07/981,199, (now U.S. Pat. No. 5,425,100), which is assigned to the same assignee as the current application, Thomas et al teach a multi-level encoding system in which an ancillary code may be inserted into a program at each level of distribution of the program. Each ancillary code identifies the source in its corresponding level of the multi-level encoding system. Thus, the program may be tracked through the distribution system.

As discussed above, systems which rely upon encoded broadcasts to identify programs require that all programs be encoded by at least one of the program sources (e.g., broadcasters) in the distribution system. Even in the unlikely event that all broadcasters were to agree to cooperate, occasional encoding equipment failures would likely cause gaps in the data provided by systems that rely solely on ancillary codes. These gaps would cause losses of rating data and would render all of the program share measurements meaningless whenever any significant number of programs are not encoded. Thus, there is a need to collect program identifying data even when there is no ancillary code present in the programs to be identified.

Furthermore, several broadcast measurement systems have been suggested which do not detect embedded ancillary codes in order to identify programs, but which instead monitor program content. These systems generally receive programs to be monitored at a measurement site, extract broadcast signatures from the programs, and compare these broadcast signatures with corresponding reference signatures which have been extracted from previous broadcasts of the programs to be monitored or from reference copies of these programs (e.g., distribution tapes) and which are stored in a reference library. For example, in U.S. Pat. No. 4,697,209, which is assigned to the same assignee as the current application, a program monitoring system is disclosed in which broadcast signatures are collected in sampled households relative to certain program content (e.g., a scene change in the video portion of a monitored program). These broadcast signatures are subsequently compared to reference signatures collected by reference equipment tuned to broadcast sources available in the selected market. A favorable comparison between broadcast signatures and corresponding reference signatures indicates the programs, not just the channels, being viewed. A similar program monitoring system is disclosed in U.S. Pat. No. 4,677,466, which is assigned to the same assignee as the current application and which logs the broadcasts of selected programs (e.g., commercial advertisements).

There are several problems with monitoring equipment which uses extracted signatures in order to identify programs. For example, in order for monitoring equipment to extract useful signatures which can be successfully correlated, the monitoring equipment is necessarily complex if there are too many programs or stations (e.g., more than several hundred) to be monitored. Additionally, such systems rely on reference measurement sites that collect reference signatures from known program sources. When one set of reference equipment fails, all reference signature data for that program source may be lost. Therefore, a redundant backup reference system must be installed. Such systems then become computationally expensive, and their use has been restricted by the cost of computer hardware. Also, in those systems which extract broadcast signatures at a monitoring site and transmit the broadcast signatures to the reference site for correlation with the reference signatures, substantial resources are required in order to process and communicate the broadcast signatures, to transmit these signatures to the reference site, and to compare theses signatures with valid reference signatures. Furthermore, matching signatures must be further processed and compared with program records.

The present invention overcomes one or more of the problems associated with prior art audience measurement systems.

SUMMARY OF THE INVENTION

Therefore, in accordance with one aspect of the present invention, an audience measurement system identifies a program which is transmitted from a signal source and to which a receiver is tuned. The audience measurement system includes code reading means, channel status determining means, and identifying means. The code reading means reads an ancillary code of the program to which the receiver is tuned. The channel status determining means determines channel status relating to channels to which the receiver is tuned. The identifying means identifies the program from at least one of the ancillary code and the channel status.

In another aspect of the present invention, an audience measurement system includes code reading means, channel status determining means, and storing means. The code reading means reads an ancillary code of a program to which a receiver is tuned. The channel status determining means determines channel status relating to channels to which the receiver is tuned. The storing means stores the ancillary code read by the code reading means if the ancillary code is readable by the code reading means and stores channel status determined by the channel status determining means if the ancillary code is not readable by the code reading means.

In still another aspect of the present invention, an audience measurement system includes code reading means, channel status determining means, and communicating means. The code reading means reads an ancillary code of a program to which a receiver is tuned. The channel status determining means determines channel status relating to channels to which the receiver is tuned. The communicating means communicates ancillary codes read by the code reading means to a remote site and communicates channel status determined by the channel status determining means to the remote site if ancillary codes are not readable by the code reading means.

In a further aspect of the present invention, a method of identifying programs received by a receiver includes the steps of a) detecting, at the receiver, a signal corresponding to the programs, b) reading ancillary codes if the ancillary codes are present in the signal and are readable, c) determining channel status relating to channels to which the receiver has been tuned, d) forwarding the ancillary codes and the channel status to a central office, e) if the ancillary codes were read, comparing, in the central office, the ancillary codes with a library to thereby identify the programs, and f) if the ancillary codes were not read, comparing, in the central office, the channel status with a library to thereby identify the programs.

In yet a further aspect of the present invention, a method of measuring audiences in statistically selected households includes the steps of a) in each statistically selected household, detecting signals corresponding to programs, b) in each statistically selected household, reading ancillary codes when the ancillary codes are present in the signals, and c) in each statistically selected household, determining channel status information relating to channels to which receivers are tuned when ancillary codes are not present in the signals.

In still a further aspect of the present invention, a method of identifying programs to which a receiver is tuned comprises the steps of a) detecting signals corresponding to the programs, b) reading ancillary codes when the ancillary codes are readable in the signals, c) determining channel status information relating to channels to which the receivers are tuned, d) identifying the programs from the ancillary codes if the ancillary codes are readable, and e) identifying the programs from the channel status information if the ancillary codes are not readable.

BRIEF DESCRIPTION OF THE DRAWINGS

These and other features and advantages will become more apparent from a detailed consideration of the invention when taken in conjunction with the drawing in which:

FIG. 4 is a tabular example of tuning records stored by the household metering apparatus of the coded/non-coded audience measurement system shown in FIGS. 1 and 2; and, FIG. 5 is a flow chart of the program recognition performed by a central office of the coded/non-coded audience measurement system shown in FIGS. 1 and 2.

DETAILED DESCRIPTION

Measurement System Overview

Figure 1:
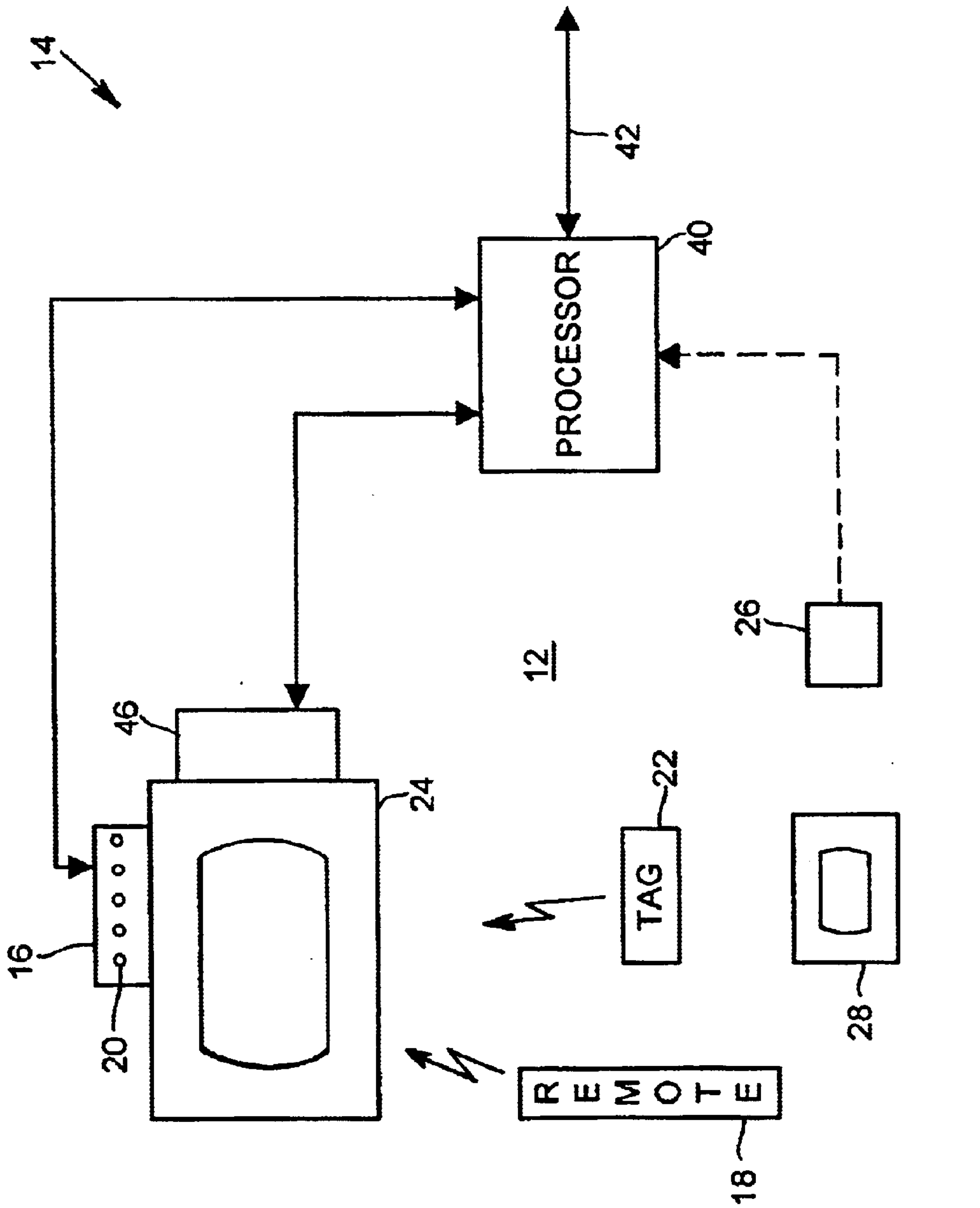
FIGS. 1 and 2 schematically illustrate an example coded/non-coded audience measurement system.
Figure 2:
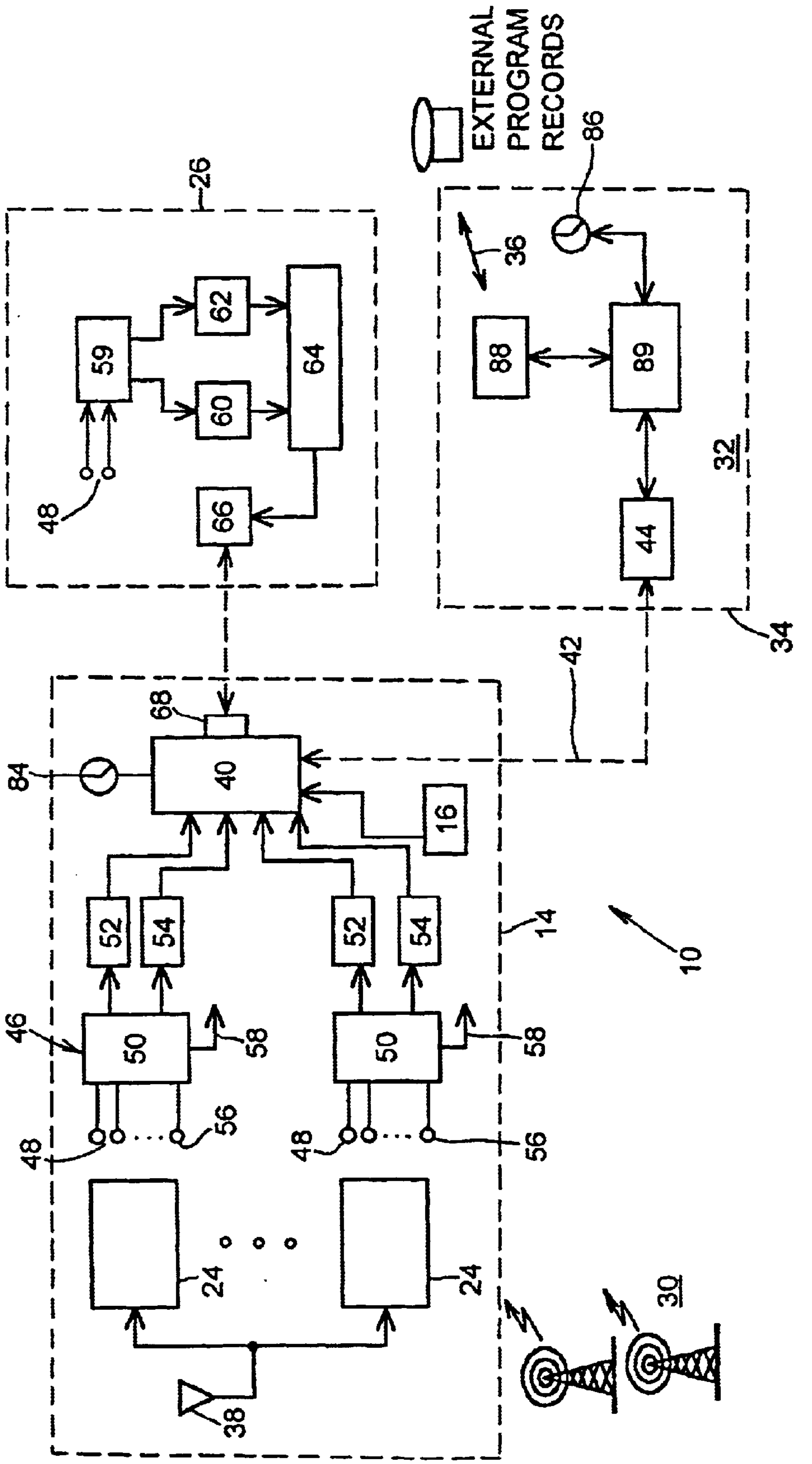

As shown in FIGS. 1 and 2, a coded/non-coded audience measurement system 10 measures the viewing habits of the members of a statistically selected household 12. The coded/non-coded audience measurement system 10 includes a household metering apparatus 14 located in the statistically selected household 12. The household metering apparatus 14 may include an audience composition determination device 16, which is referred to hereinafter as a people meter.

The people meter 16 allows audience members to indicate their presence by means of a remote control 18 and/or a plurality of pushbutton switches 20. The existing remote control which the members of the statistically selected household 12 used prior to installation of the coded/non-coded audience measurement system 10 may be used for the remote control 18. The remote control 18 may instead be provided as part of the household metering apparatus 14. Ideally, in order to minimize changes in the statistically selected household 12, the household metering apparatus 14 should be configured to use the existing remote controls. Alternatively, or additionally, a personal tag 22 may be worn by a viewer and may periodically broadcast an identifying message to the people meter 16. Each viewer in the household may have a personal tag 22 which emits an identifying message exclusively identifying the viewer. Instead of, or in addition to, being arranged to respond to the remote control 18, to the pushbutton switches 20, and/or to the personal tag 22, the people meter 16 may be arranged to include an image sensing device and a computer image processing system (not shown) in order to passively identify the viewers in a viewing audience without requiring the active participation of the viewers to be identified. Examples of such system are disclosed by Lu in U.S. Pat. No. 4,858,000 and U.S. Pat. No. 5,031,228 and by Lu et al. in allowed U.S. patent application Ser. No. 07/992,383 filed on Dec. 15, 1992, now U.S. Pat. No. 5,550,928.

Accordingly, the people meter 16 identifies each viewing member of the viewing audience. It is desirable, but not essential, that the people meter 16 be located in the vicinity of a television to be metered. One such television receiver 24 is shown in FIG. 1.

Although many audience measurements are restricted to a determination of viewing activity at the television receiver 24 within the statistically selected household 12, it is desirable to also measure viewing and tuning that may be done outside of the statistically selected household 12. For this purpose, a portable metering apparatus 26 is provided. The portable metering apparatus 26 may be worn or carried by a viewer of the statistically selected household 12 when, for example, the viewer is away from the statistically selected household 12. In accordance with the present invention, the portable metering apparatus 26 is capable of automatically or manually determining the programs, channels, and/or stations to which a television in the vicinity of the portable metering apparatus 26 is tuned. The portable metering apparatus 26 may be carried by the person whose viewing habits are being metered, in which case the portable metering apparatus 26 is a portable personal metering apparatus, and/or the portable metering apparatus 26 may be portable in order to meter viewing habits in conjunction with a portable television or the like. Thus, in this latter case, the portable metering apparatus 26 may be used in conjunction with a portable television 28.

As shown in FIG. 2, the coded/non-coded audience measurement system 10 generally includes the household metering apparatus 14, which is installed in each of a plurality of statistically selected households, such as the statistically selected household 12, and which receives signals from one or more program signal sources 30.

The coded/non-coded audience measurement system 10 further includes a central office apparatus 32 which is installed at a central site 34 and which collects data from the household metering apparatus 14 and from external program records sources as indicated by an arrow 36. The central office apparatus 32 processes the data collected from the household metering apparatus 14 and/or from the external program records sources to produce audience measurement reports.

Although FIG. 2 schematically depicts the program signal sources 30 as being broadcast transmission antennas which transmit program signals that are received by an antenna 38 in the statistically selected household 12, it will be understood that program signals can be transmitted and/or distributed by a wide variety of means such as by coaxial cables, fiber optic cables, satellites, rented tapes, disks, and so on. Moreover, although FIG. 2 shows encoded and non-encoded television program signals being distributed to a plurality of television receivers 24 in a statistically selected household 12, it will become clear in the following discussion that the present invention is equally applicable to encoded radio signals or to any other encoded video and/or audio sources, such as radio broadcasts, audio cable transmissions, tape cassettes and so on.

The household metering apparatus 14 of the coded/non-coded audience measurement system 10 preferably includes a data storage and telecommunication processor 40 that communicates, via a public switched telephone network 42, with a telecommunication processor 44 of the central office apparatus 32. The household metering apparatus 14 also includes tuning measurement equipment 46 for each of the television receivers 24. Each tuning measurement equipment 46 includes one or more sensors 48, a signal pre-processing circuit 50, a household ancillary code reader 52, and a household channel and/or station detector 54.

Any of a variety of sensors may be used for the sensors 48. The function of the sensors 48 is to detect coded transmissions from the program sources 30 and to detect channel and/or station selections from the remote control 18. For example, the sensors 48 may be, inter alia, a physical connection to the video circuits of the television receiver 24 for ancillary code detection and a physical connection to the infra-red sensor of the television receiver 24 for channel and/or station selection detection. The preferred sensors for the sensors 48, however, are non-intrusive sensors such as microphones for ancillary code detection and separate infra-red sensors responsive to the remote control 18 for channel and/or station selection detection. Microphones and infra-red sensors, which can be installed in the immediate vicinity of the television receiver 24 so as to pick up the sounds emanating from the speakers of the television receiver 24 and infra-red signals from the remote control 18, offer an installation which is non-intrusive. Because the installation is non-intrusive, the television receivers 24 need not be opened up in order to electrically connect the sensors 48 thereto. Objections which might otherwise be raised are thereby avoided.

Since microphones used as the sensors 48 will also pick up other sounds in the area, noise canceling microphones may be used therefor or additional microphones 56 may be installed so that they pick up relatively more of the background noise and relatively less of the sounds from the speakers of the television receivers 24. The output signal from the additional microphone 56 is used by the signal pre-processing circuit 50 to at least partially delete background noise from the output signals of the microphones of the sensors 48 by matching the amplitudes of the output signals from the microphones of the sensors 48 and from the additional microphone 56, and by then either subtracting the output signals of the microphones of the sensors 48 from the output signal of the additional microphone 56 or subtracting the output signal of the additional microphone 56 from the output signals of the microphones of the sensors 48. Alternatively, the signal pre-processing circuit 50 may employ other audio signal processing methods to reduce background noise. For example, the signal pre-processing circuit 50 may employ input filters that can, for example, pass only those audio signals in a 300 Hz–3000 Hz passband in order to eliminate traffic noise and to remove artifacts introduced by the response characteristics of the household's appliances and equipment.

Other examples of non-intrusive sensors which can be used for the sensors 48 include inductive audio pickups operatively associated with the audio output circuitry of the metered televisions 24, video cameras located near the screen of the television receiver 24 to collect video images thereon, or photosensors located adjacent to the screen of the metered televisions 24 to measure overall changes in screen luminance as a function of time, or a combination of the above.

The sensors 48 are arranged to acquire at least portions of the program signals corresponding to the programs or stations that household members select for viewing on the televisions 24. These portions of the program signals acquired by the sensors 48 are pre-processed, as desired, by the pre-processing circuit 50. The signal pre-processing circuit 50 supplies pre-processed program signals both to the household ancillary code reader 52, which attempts to locate and read ancillary codes from the program signals corresponding to the programs or stations selected by one or more viewers in the statistically selected household 12, and to the household channel and/or station detector 54, which generates channel and/or station selection information from the program selections made by one or more viewers using the remote control 18.

The household ancillary code reader 52 may be of a type similar to that disclosed by Haselwood, et al. in U.S. Pat. No. 4,025,851, the disclosure of which is incorporated herein by reference, or U.S. Pat. Nos. 5,425,100 and 5,526,427 by Thomas et al. An ancillary code, as disclosed by Haselwood, et al. in U.S. Pat. No. 4,025,851, is inserted into the program video and is read by the disclosed apparatus. Although video encoding is more widely used as a means of tracking television broadcasts than is audio encoding, video encoding is less amenable to detection by not-intrusive sensors. Thus, if any one or more of the sensors 48 are microphones, the ancillary code must be placed in audio and may be read by apparatus similar to the video code reading apparatus disclosed by Haselwood, et al. in U.S. Pat. No. 4,025,851 or by apparatus similar to the audio code reading apparatus disclosed by Weinblatt in U. S. Pat. No. 4,718,106. It will be clear to those skilled in the art, however, that essentially the same benefits are available if the video codes taught by Haselwood, et al. in U.S. Pat. No. 4,025,851 or by Thomas, et al. in U.S. Pat. Nos. 5,425,100 and 5,526,427 are used. The household channel and/or station detector 54 may be the type disclosed in U.S. Pat. No. 4,697,209 by Kiewit, et al and by Zurlinden in U.S. Pat. No. 4,972,503.

The ancillary code may have any form as long as the program, channel and/or station associated therewith is uniquely identified by the ancillary code. Also, as taught in U.S. Pat. Nos. 5,425,100 and 5,526,427 by Thomas et al, the ancillary code may comprise a plurality of segments each containing unique source information so that the information in each segment is representative of a selected one of a plurality of levels of distribution of the associated program.

Since an ancillary code can carry with it all the information necessary for identifying a broadcast transmission, and since code readers are well-known, a coded/non-coded audience measurement system that uses encoded program transmission is economically very attractive. Moreover, code readers for reading ancillary codes can be provided with appropriate checking algorithms and the like so that the number of failures to accurately read the ancillary code (such as the multi-level ancillary code described by Thomas et al in U.S. Pat. Nos. 5,425,100 and 5,526,427) can be made arbitrarily low.

The problem with a system that relies exclusively on ancillary codes, as noted earlier herein, is that not all programs, channels, and/or stations are provided with useable ancillary codes. Thus, it is advantageous to also include the household channel and/or station detector 54 to identify selected channels and/or stations. The selections of channels and/or stations by the members of the statistically selected household 12 may be used when ancillary codes are not included in the programs being viewed. Accordingly, the household channel and/or station detector 54 is also included in the household metering apparatus 14 in addition to the household ancillary code reader 52 so that the selections of channels and/or stations by the members of the statistically selected household 12 can be determined and collected when ancillary codes cannot be read.

When a member of the statistically selected household 12 takes a control action by use of the remote control 18, the signals emanating from the remote control 18 are received by both the television receiver 24 and appropriate ones of the sensors 48 of the tuning measurement equipment 46. Therefore, if the household ancillary code reader 52 is unable to locate and/or read valid ancillary codes from the program signals corresponding to the programs or stations selected by one or more members in the statistically selected household 12, channels and/or stations detected by the household channel and/or station detector 54 may be used instead to provide the information relating to the viewing habits of the members of the statistically selected household 12. Systems for detecting channels and/or stations are described by Kiewit in U.S. Pat. No. 4,876,736 and by Zurlinden in U.S. Pat. No. 4,972,503.

Additionally, or alternatively, if the household ancillary code reader 52 is unable to locate and/or read valid ancillary codes from the program signals corresponding to the programs or stations selected by one or more members in the statistically selected household 12, the tuning measurement equipment 46 may be arranged to prompt such members to enter the selected channel and/or station by use of an input device such as the remote control 18, the pushbutton switches 20 of the people meter 16, a voice recognition sensor, and so on. The prompt may be provided by the television receiver 24 through the use of on-screen information or by a transducer 58. The transducer 58 may be of the type which provides an audio signal, a synthesized voice message from a speaker, a visual display, or a flash from an LED, a CRT, or an LCD, or the like. The prompted information may be received by an appropriate one of the sensors 48 or by the additional microphone 56 and is stored for eventual transmission to the central office apparatus 32.

The data storage and telecommunication processor 40 selectively stores the ancillary codes that have been read by the household ancillary code reader 52 and/or the channel and/or station information provided by the household channel and/or station detector 54. It should be noted that in the event that a partially legible ancillary code is read by the household ancillary code reader 52, the data storage and telecommunication processor 40 may also store the code fragment (e.g., one field of a multi-level ancillary code) for use by the coded/non-coded audience measurement system 10.

The portable metering apparatus 26 may be used to gather ancillary codes or channel and/or station selection information either in the statistically selected household 12 or at other locations where the members of the statistically selected household 12 may encounter media. These locations include, for example, other households, movie theaters, automobiles, and so on.

The portable metering apparatus 26 may be similar to the household metering apparatus 14 and may also have one or more sensors 48, a signal pre-processing circuit 59 which may be similar to the signal pre-processing circuit 50, an ancillary code reader 60 which may be similar to the household ancillary code reader 52, and a channel and/or station detector 62 which may be similar to the household channel and/or station detector 54. The data that the portable metering apparatus 26 generates is temporarily stored in a random access memory 64 so that it may be occasionally transferred to the data storage and telecommunication processor 40 by way of an interface circuit 66, such as a first modem, and a corresponding interface circuit 68, such as a second modem, associated with the data storage and telecommunication processor 40. The portable metering apparatus 26 may further include a rechargeable battery for supplying power to its sensors 48, its signal pre-processing circuit 59, the ancillary code reader 60, the channel and/or station detector 62, the random access memory 64 and the interface circuit 66.

As is known in the art, data may be transmitted between the interface circuits 66 and 68 by direct electrical connections, radio frequency transmissions, pulsed infrared signalling, etc. The transfer of data by the portable metering apparatus 26 to the data storage and telecommunication processor 40 can be operationally accomplished during recharging of the battery of the portable metering apparatus 26 by placing the portable metering apparatus 26 in a physical cradle which supports the recharging of the battery and data link communications with the data storage and telecommunication processor 40.

The sensors 48 of the portable metering apparatus 26 may be the same or different than the sensors 48 of the household metering apparatus 14 and may include a keyboard in order to allow the user to directly enter the program being received in the absence of ancillary codes. In addition, the sensors 48 of the portable metering apparatus 26 may include a vibration transducer such as the transducer 58 in order to prompt the user to enter channel and/or station selections in the absence of ancillary codes.

The central site 34, which collects data from all of the statistically selected households 12, is indicated in FIG. 2 as being at a single location. Although this centralized single location for the collection of data may be advantageous in connection with the compilation of a single national television audience measurement from the different broadcasts in different cities, it should be clear that the central site 34 can alternatively be located at a site in each of the market areas being monitored. When portions of the systems are dispersed at a number of different locations, it is common practice to composite partially processed data from each site at a single central office and to issue the reportable data from that central location.

In-Household Measurements

Figure 3:
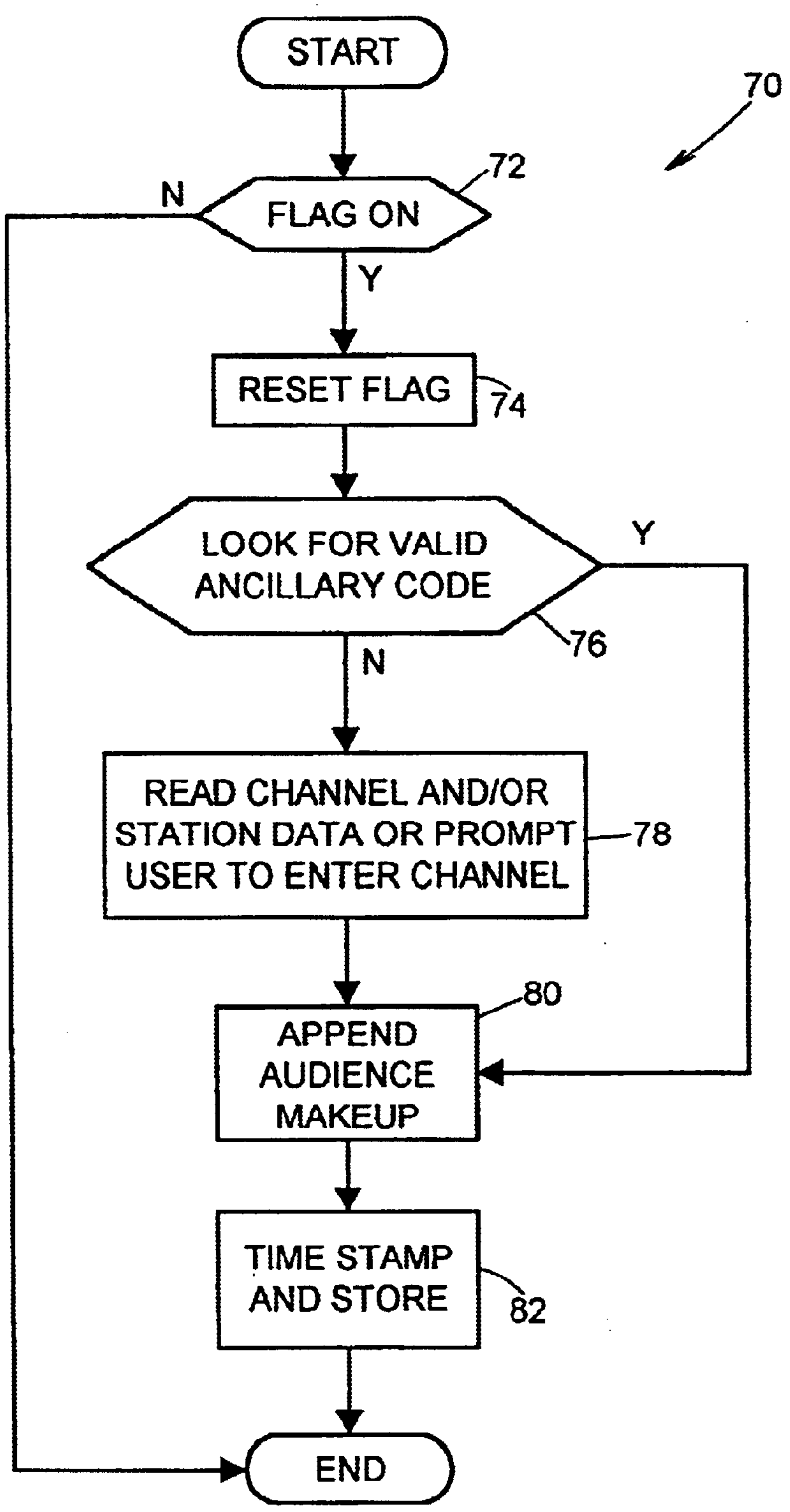
FIG. 3 is a flow chart of the operations performed by the household metering apparatus of the coded/non-coded audience measurement system shown in FIGS. 1 and 2.

The detection of ancillary codes, channel and/or station selections, and audience makeup by the tuning measurement equipment 46 and the people meter 16 may be performed by a routine 70 shown in FIG. 3. This routine 70 may be performed by a processor in the data storage and telecommunication processor 40.

At the beginning of the routine 70, a block 72 determines whether tuning data is needed. As discussed in U.S. Pat. No. 4,697,209, a logical flag may be set when either a television is turned on or the channel to which the television receiver is currently tuned is changed. As noted in U.S. Pat. No. 4,697,209, a loss of video synchronization may be used to set the flag to indicate a channel change if the television 24 is being metered by use of its video signal. On the other hand, if the television 24 is being metered by use of its audio signal (such as where a non-intrusive audio sensor is used), a sudden change in the audio may be used to set the flag to indicate a channel change. Alternatively, either the horizontal flyback 15 KHz "sound" or the average sound/picture level from the television 24 may be monitored to determine a change in the on/off status of the television 24.

When the flag is set, the block 72 determines that it is time to capture data. It should be noted that if no such flagging event occurs within some predetermined time-out period, and if the television 24 is on, the flag is set anyway in order to ensure that a predetermined minimum number of ancillary codes, channel and/or station selection data, and audience makeup data will be captured during any given time period.

If the block 72 determines that the flag is not set, the routine 70 is ended and is reentered after a predetermined amount of time. This operation avoids unnecessary monitoring of televisions and/or radios which are off. If the block 72 determines that the flag is set, a block 74 resets the flag, and a block 76 reads an ancillary code in the signal received by an appropriate sensor 48 and located and read by the household ancillary code reader 52, if such an ancillary code is present in this signal. If such an ancillary code is not present or is not capable of being read, a block 78 then reads the channel and/or station selection information generated by the household channel and/or station detector 54. Alternatively, if an ancillary code is not present or capable of being read, the block 78 may instead prompt the user to manually enter the viewed channel and/or station by using the remote control 18, the pushbutton switches 20 of the people meter 16, a voice recognition sensor, the keyboard of the sensors 48 of the portable metering apparatus 26, etc. The block 78 then reads the prompted channel and/or station selection information manually entered by the user. A block 80 attaches the audience makeup data from the people meter 16 to either the detected and valid ancillary code or to the channel and/or station selection data, as appropriate.

A block 82, by use of a clock such as a time-of-day clock 84 at the statistically selected household 12 (FIG. 2), adds a time stamp to the ancillary code read by the block 76 and to the audience makeup attached by the block 80 or adds a time stamp to the channel and/or station selection data read by the block 78 and the audience makeup data attached by the block 80, as appropriate. The block 82 also stores the time stamped information.

One of the timing methods which may be used by the block 82 includes the use of clock signals from the time-of-day clock 84 which may be synchronized to a time zone such as the eastern standard time zone. This method involving the use of time-of-day clock time is most appropriate in the measurement of real-time audiences, i.e. measurements that, usually in the interest of economy, ignore time-shifted viewing of programs recorded in the home and time-independent viewing of rental tapes.

This clock signal timing method generally requires that the time-of-day clock 84 at the statistically selected household 12 and a clock 86 at the central site 34 of the coded/non-coded audience measurement system 10 be synchronized to much less than the minimum reported viewing interval (which, for example, may be as short as one second, or as long as one minute). It has been common commercial practice for more than a decade to provide synchronization between clocks in an audience measurement system so as to maintain an accuracy of about one second at any instant during the day following synchronization. The expectation value of this one second drift error is limited by thermal considerations. It is well known that this one second variance can be reduced to about 0.1 second per day by controlling the temperatures of the various clocks 84 and 86.

A program library 88 at the central site 34 of the coded/non-coded audience measurement system 10 stores program records which correlate ancillary codes and channel status information to programs IDs which identify the programs to which receivers may be tuned. The program library 88 is used by a processor 89 of the central office apparatus 32 in a manner to be discussed hereinafter.

The data available from the household metering apparatus 14 of the coded/non-coded audience measurement system 10 generally comprises a chronologically ordered set of tuning records 90 shown in FIG. 4, where a tuning record consists of a flag field 92, a type field 94 (e.g., to characterize the ancillary code or channel status as having been read in response to different types of conditions, such as absolute timing, a channel change, a television on/off change, and/or the like), a code field 96, a channel status field 98 which contains the selected channel, and a time data field 100 containing the time at which (i) the corresponding ancillary code was detected, or (ii) the corresponding channel was selected, or (iii) the corresponding flag was set. The specific example shown in FIG. 4 could be generated by turning a television receiver on at a time H:M:0 and viewing an encoded program until time H:M+3:03, at which time a new program appeared on that channel and the viewer retuned (at time H:M+3:05) to a different channel and/or station carrying a program that did not have a legible ancillary code associated therewith.

Central Office Operations

The central office apparatus 32 collects data from a plurality of statistically selected households 12. As will be apparent from the following discussion, the central office functions may be done at a single location as shown. However, for a small, simple system, the central office functions may be performed at a household site. Alternatively, for a large system (e.g., one that involves both local and national measurements), there may be a hierarchy of central offices in which some of the functions (e.g., identification of real time viewing) are done locally at each of a plurality of local central offices, while other functions (e.g., identification of viewing of rented video tapes) may be done at a single master central office.

Figure 5:
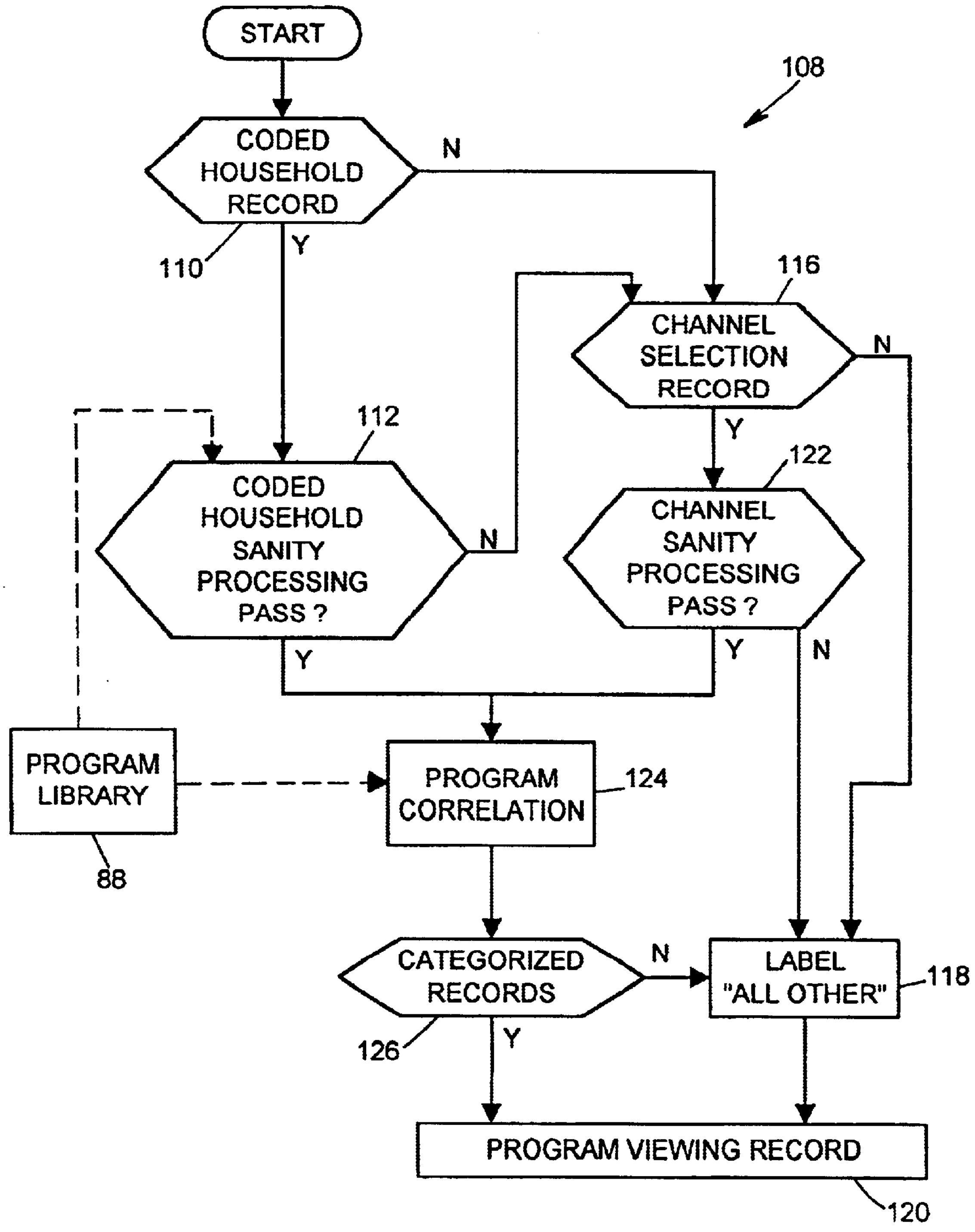

The major function of the central office apparatus 32 is that of identifying viewed programs. For this process, the central office apparatus 32 retrieves all of the tuning records 90 from all of the statistically selected households 12. These records are processed by the processor 89 in accordance with a routine 108 which is shown in FIG. 5.

A block 110 determines whether the tuning records 90 from the statistically selected households 12 include ancillary codes in the code field 96. If the tuning records 90 from the statistically selected households 12 include ancillary codes in the code field 96, the ancillary codes are subjected to sanity processing by a block 112. For example, those ancillary codes that are outside of the possible range for ancillary codes, those ancillary codes that vary too quickly over a selected time interval, and those ancillary codes that are not valid for the specified time stamp are not passed by the block 112. The sanity processing performed by the block 112 is based upon ancillary code information which is stored in the program library 88.

If the tuning records 90 from the statistically selected households 12 do not include ancillary codes in the code field 96, or if the tuning records 90 from the statistically selected households 12 include ancillary codes in the code field 96 but the ancillary codes do not pass the sanity processing performed by the block 112, the tuning records are passed to a block 116 for channel selection record processing. If the block 116 determines that the records contain no channel selection records, the tuning record is labelled by a block 118 as "All Other" and a block 120 stores this labelled tuning record.

If the block 116 determines that the tuning records contain channel selection records, a block 122 performs channel status sanity processing on such tuning records. This channel status sanity processing may include, for example, determination of whether the channel status in a tuning record is in a possible range of channels, whether a flag has been set indicating that a channel status resulted from a very fast channel change (indicating channel surfing), and whether a flag has been set indicating that a channel status resulted from a very slow channel change (which may be set, for example, as a result of issuing a prompt to which no one responds indicating that the monitored television is not being watched). If the channel status in a tuning record does not pass the sanity processing performed by the block 122, the tuning record is labelled by the block 118 as "All Other" and the block 120 stores this labelled tuning record.

The ancillary codes which pass the sanity processing performed the block 112, and the tuning records which pass the sanity processing performed by the block 122, are processed by a block 124. The block 124 correlates the ancillary codes and channel status information with the program records stored in the program library 88 in order to identify the programs to which the television 24 was tuned since the last collection of data by the central office apparatus 32 from the tuning measurement equipment 46. That is, for those tuning records 90 which include ancillary codes, the programs IDs associated with the ancillary codes are obtained from the program-code library 88. On the other hand, for those tuning records 90 which do not include readable ancillary codes but which do include channel status information, the programs IDs associated with the channels contained in the channel status information are obtained from the program-code library 88. These program IDs identify the programs covered by the tuning records 90 which pass the block 112 or the block 122. The block 124 also determines whether the programs identified by the ancillary codes and by the channel status occurred in the correct time slots and in the correct geographic location as indicated by the program records stored in the program library 88.

A block 126 then tests the results of the processing by the block 124. If the programs identified by the ancillary codes and the channel status occurred in the correct time slots and in the correct geographic location as indicated by the program records stored in the program library 88, the block 120 stores these tuning records and program IDs. On the other hand, if the programs identified by the ancillary codes and the channel status did not occur in the correct time slots and in the correct geographic location as indicated by the program records stored in the program library 88, the block 118 labels the corresponding records as "All Other" and a block 120 stores these labelled tuning records.

Although the present invention has been described with respect to several preferred embodiments, many modifications and alterations have been described and still other modifications and alterations can be made without departing from the scope of the present invention. For example, the present invention can be used to identify either the programs or the stations being viewed or listened to by an audience. Therefore, as used herein, the term "programs", in addition to meaning segments of various lengths such as all or parts of programs, commercials, promos, public service announcements, and so on, can also mean stations being viewed or listened to by an audience. Also, although the manually operated devices on the people meter 16 which allow audience members to indicate their presence have been described as a plurality of pushbutton switches 20, it should be appreciated that the these manually operated devices could be levers, knobs, voice recognition devices, or the like. Furthermore, although FIG. 1 shows the household metering apparatus 14 being located in the vicinity of the television 24, it should be appreciated that the sensors 48 may be located near the television 24 but that the household metering apparatus 14 may be located remotely from the television 24.

What is claimed is:

1. An audience measurement system for collecting program identifying data associated with a program which is transmitted from a signal source and to which a receiver is tuned, the audience measurement system comprising:

a first data collector, wherein the first data collector ranged to collect first program identifying data, wherein the first data collector is a code reader arranged to read an ancillary code of the program to which the receiver is tuned, and wherein the first program identifying data includes the ancillary code;

a second data collector, wherein the second data collector is arranged to collect second program identifying data, and wherein the second program identifying data is manually entered by a user of the receiver; and, wherein the second data collector is arranged to collect the second program identifying data if the code reader cannot read the ancillary code in the program received by the receiver.

2. The audience measurement system of claim 1 wherein the second data collector comprises a sensor responsive to a remote control operated by the user of the receiver.

3. The audience measurement system of claim 1 further comprising a people identifier, wherein the people identifier is arranged to identify individual people in a monitored audience.

4. The audience measurement system of claim 3 arranged to time stamp and store the second program identifying data and information relating to any identified people in the monitored audience.

5. The audience measurement system of claim 3 arranged to time stamp and store the ancillary code and information relating to any identified people in the monitored audience.

6. The audience measurement system of claim 3 arranged to time stamp and store the ancillary code and information relating to any identified people if the ancillary code is readable and to time stamp and store the second program identifying data and information relating to any identified people in the monitored audience if the ancillary code is not readable.

7. An audience measurement system for collecting program identifying data associated with a program which is transmitted from a signal source and to which a receiver is tuned, the audience measurement system comprising:

a first data collector, wherein the first data collector is arranged to collect first program identifying data, wherein the first data collector is a code reader arranged to read an ancillary code of the program to which the receiver is tuned, and wherein the first program identifying data includes the ancillary code;

a second data collector, wherein the second data collector is arranged to collect second program identifying data, and wherein the second program identifying data is manually entered by a user of the receiver; and, wherein the audience measurement system is arranged to time stamp and store the ancillary code if the ancillary code is readable and to time stamp and store the second program identifying data if the ancillary code is not readable.

8. An audience measurement system comprising:

a first data collector, wherein the first data collector is arranged to collect first program identifying data, wherein the first data collector is a code reader arranged to read an ancillary code of the program to which the receiver is tuned, and wherein the first program identifying data includes the ancillary code;

a second data collector, wherein the second data collector is arranged to collect second program identifying data, and wherein the second program identifying data is manually entered by a user of the receiver a memory, wherein the memory stores the ancillary code read by the code reader if the ancillary code is readable by the code reader and stores the second program identifying data collected by the second data collected only if the ancillary code is not readable by the code reader.

9. The audience measurement system of claim 8 further comprising a people identifier, wherein the people identifier is arranged to identify individual people in a monitored audience.

10. The audience measurement system of claim 9 wherein the people identifier is arranged to passively identify individual people in a monitored audience.

11. The audience measurement system of claim 9 wherein the people identifier comprises keys.

12. The audience measurement system of claim 9 wherein the memory is arranged to store time stamped second program identifying data and time stamped information relating to any identified people in the monitored audience.

13. The audience measurement system of claim 9 wherein the memory is arranged to store time stamped ancillary codes and time stamped information relating to any identified people in the monitored audience.

14. The audience measurement system of claim 8 wherein the second data collector comprises a sensor responsive to a remote control manually operated by the user of the receiver.

15. The audience measurement system of claim 8 wherein the second data collector comprises a prompter, and wherein the prompter is arranged to prompt the user to manually enter the second program identifying data.

16. The audience measurement system of claim 15 wherein the prompter is arranged to provide prompts in the form of on-screen prompts.

17. The audience measurement system of claim 15 wherein the prompter comprises a transducer for providing prompts to a user.

18. The audience measurement system of claim 17 wherein the transducer provides a visual display.

19. The audience measurement system of claim 17 wherein the transducer provides an audio signal.

20. The audience measurement system of claim 17 wherein the transducer provides a synthesized voice message from a speaker.

21. The audience measurement system of claim 8 wherein the memory is arranged to store time stamped second program identifying data.

22. The audience measurement system of claim 8 wherein the memory is arranged to store time stamped ancillary codes.

23. The audience measurement system of claim 8 wherein the second data collector comprises manually operable keys.

24. A method of collecting program identifying data related to programs received by a receiver located within a building, the method comprising the steps of:

a) detecting signals corresponding to the programs;

b) if a detected signal includes an ancillary code, reading the ancillary code from the signal, wherein the ancillary code is related to a program corresponding to the detected signal;

c) if the detected signal does not include an ancillary code, collecting manually entered program identifying data related to the program corresponding to the detected signal, wherein steps a), b), and c) are performed within the building;

d) forwarding the ancillary codes and the manually entered program identifying data to a remote building;

e) if the detected signal includes an ancillary code, comparing, in the remote building, the ancillary code with a first library to thereby identify the program; and f) if the detected signal does not include an ancillary code, comparing, in the remote building, the manually entered program identifying data with a second library to thereby identify the program.

25. A method of collecting program identifying data related to programs received by a receiver located within a building, the method comprising the steps of:

a) detecting a signal corresponding to the programs;

b) reading ancillary codes from the signal, wherein the ancillary codes are related to at least some of the programs;

c) collecting manually entered program identifying data related to at least some programs to which the ancillary codes are not related, wherein steps a), b), and c) are performed within the building; and wherein, for one of the programs, step c) is performed only if an ancillary code cannot be read from the one program in step b).

26. A method of collecting program identifying data related to programs received by a receiver located within a building, the method comprising the steps of:

a) detecting a signal corresponding to the programs;

b) reading ancillary codes from the signal, wherein the ancillary codes are related to at least some of the programs;

c) collecting manually entered program identifying data related to at least some programs to which the ancillary codes are not related, wherein steps a), b), and c) are performed within the building;

d) identifying the at least some programs to which the ancillary codes are related from the ancillary codes;

e) identifying the at least some programs to which the ancillary codes are related from the manually entered program identifying data; and, wherein, for one of the programs, step e) is performed only if the one of the programs cannot be identified from corresponding ancillary codes.

27. A method of collecting program identifying data related to programs received by a receiver located within a building, the method comprising the steps of:

a) detecting a signal corresponding to the programs;

b) reading ancillary codes from the signal, wherein the ancillary codes are related to at least some of the programs;

c) collecting manually entered program identifying data related to at least some programs to which the ancillary codes are not related, wherein steps a), b), and c) are performed within the building; and, wherein step c) further comprises the step of prompting a user to manually enter the manually entered program identifying data only if the ancillary codes cannot be read in the programs received by the receiver.

28. A method of measuring audiences in a plurality of statistically selected households, the method comprising the steps of:

a) in each of the statistically selected households, detecting a signal corresponding to a program to which a receiver is tuned;

b) in each of the statistically selected households, reading an ancillary code from the signal when the ancillary code is present in the program; and, c) in each of the statistically selected households, collecting manually entered program identifying data related to the program, wherein step c) is performed only in the event that the ancillary code cannot be read from the signal.

29. The method of claim 28 further comprising the step of associating an identity of an audience member with the ancillary code or the manually entered program identifying data.

30. The method of claim 29 wherein the identity of the audience member includes the age and gender of the audience member.

31. The method of claim 28 wherein step c) comprises the step of collecting the manually entered program identifying data by use of a remote control and a sensor responsive to the remote control.

32. The method of claim 28 wherein step c) comprises the step of prompting a user to manually enter the manually entered program identifying data.

33. The method of claim 28 wherein steps a), b), and c) are performed by a portable metering apparatus.

34. A method of identifying a program to which a receiver is tuned, the method comprising the steps of:

a) detecting a signal corresponding to the program;

b) reading an ancillary code when the ancillary code is readable in the signal;

c) collecting manually entered program identifying data relating to the program;

d) identifying the program from the ancillary code if the ancillary code is readable; and, e) identifying the program from the manually entered program identifying data only if the ancillary code is not readable.

35. The method of claim 34 comprising the further step of associating an identity of an audience member with the ancillary code or the manually entered program identifying data.

36. The method of claim 34 wherein step c) comprises the step of detecting the manually entered program identifying data by use of a remote control and a sensor responsive to the remote control.

37. The method of claim 34 wherein step c) comprises the step of prompting a user to manually enter the manually entered program identifying data.

* * * * *

UNITED STATES PATENT AND TRADEMARK OFFICE

CERTIFICATE OF CORRECTION

PATENT NO. : 6,647,548 B1
APPLICATION NO. : 08/709180
DATED : November 11, 2003
INVENTOR(S) : Lu et al.

It is certified that error appears in the above-identified patent and that said Letters Patent is hereby corrected as shown below:

Col. 14, line 14: replace “ranged” with --is arranged--.

Col. 15, line 11: replace “user of the receiver” with --user of the receiver; and--.

Col. 15, line 15: replace “the second data collected” with --the second data collector--.

Col. 15, line 24: replace “people in a monitored” with --people in the monitored--.

Signed and Sealed this
Thirtieth Day of August, 2011

David J. Kappos
*Director of the United States Patent and Trademark Office*